United States Patent
Ishfaq et al.

(10) Patent No.: US 9,883,476 B2
(45) Date of Patent: Jan. 30, 2018

(54) REGULATING IMS USE WITH NON-VOLTE CELLULAR COMMUNICATIONS SYSTEMS

(71) Applicant: General Motors LLC, Detroit, MI (US)

(72) Inventors: Mohammad Ishfaq, Northville, MI (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 96 days.

(21) Appl. No.: 14/702,418

(22) Filed: May 1, 2015

(65) Prior Publication Data

US 2016/0323806 A1    Nov. 3, 2016

(51) Int. Cl.
| | |
|---|---|
| *H04W 60/04* | (2009.01) |
| *H04L 29/06* | (2006.01) |
| *H04W 48/18* | (2009.01) |
| *H04W 76/02* | (2009.01) |
| *H04W 48/16* | (2009.01) |

(52) U.S. Cl.
CPC ......... *H04W 60/04* (2013.01); *H04L 65/1006* (2013.01); *H04L 65/1016* (2013.01); *H04W 48/18* (2013.01); *H04W 48/16* (2013.01); *H04W 76/026* (2013.01)

(58) Field of Classification Search
CPC ..... H04W 48/02; H04W 48/10; H04W 60/04; H04W 76/026; H04W 48/18; H04W 48/16; H04L 65/1016; H04L 65/1006
USPC .......................................................... 370/259
See application file for complete search history.

(56) References Cited

U.S. PATENT DOCUMENTS

| | | | |
|---|---|---|---|
| 9,420,554 B1 * | 8/2016 | Patel ...................... | H04W 60/00 |
| 2016/0119823 A1 * | 4/2016 | Ko ........................ | H04W 24/08 |
| | | | 370/252 |
| 2016/0286514 A1 * | 9/2016 | Sahu ...................... | H04W 36/14 |

* cited by examiner

*Primary Examiner* — Obaidul Huq
(74) *Attorney, Agent, or Firm* — Christopher DeVries; Reising Ethington P.C.

(57) ABSTRACT

A system and method of registering a voice over LTE (VoLTE) capable vehicle telematics unit with a wireless carrier system includes: detecting at the vehicle telematics unit a wireless signal broadcast by a cell tower; determining from the wireless signal whether the cell tower provides cellular service using a VoLTE cellular protocol; and when it is determined that the cell tower does not provide cellular service using the VoLTE protocol, then preventing the VoLTE-capable vehicle telematics unit from attempting to wirelessly connect with the cell tower using an IP multimedia subsystem (IMS) protocol.

5 Claims, 2 Drawing Sheets

REGULATING IMS USE WITH NON-VOLTE CELLULAR COMMUNICATIONS SYSTEMS

TECHNICAL FIELD

The present invention relates to vehicle telematics units and, more particularly, to regulating the registration of a VoLTE-capable vehicle telematics unit with a wireless carrier system.

BACKGROUND

As cellular communications systems have evolved, a number of cellular protocols or technologies have been created to define the evolution. For example, cellular systems are currently transitioning between earlier cellular protocols that can be described in terms of 3G (e.g., CDMA 2000 and UMTS) and 4G long-term evolution (LTE) cellular protocols. As the transitions occur, wireless devices communicating over cellular communications systems often interact with base stations or cell towers that offer 3G cellular protocols or LTE protocols. The wireless devices may be able to communicate using both 3G and LTE cellular protocols and as cellular communications systems evolve the devices can connect with cell towers using either 3G or LTE cellular protocols.

Presently, wireless devices capable of using VoLTE cellular protocols may be programmed to initially attempt a VoLTE registration regardless of which cellular protocol is used by nearby cell towers. While this may be optimal for wireless devices that use LTE cellular protocols for both voice and short message service (SMS) messaging, it may not be for some wireless devices that are configured so that they use LTE for voice communications (VoLTE) yet rely on circuit-switched cellular protocols for SMS messaging.

SUMMARY

According to an embodiment of the invention, there is provided a method of registering a voice over LTE (VoLTE) capable vehicle telematics unit with a wireless carrier system. The method includes detecting at the vehicle telematics unit a wireless signal broadcast by a cell tower; determining from the wireless signal whether the cell tower provides cellular service using a VoLTE cellular protocol; and when it is determined that the cell tower does not provide cellular service using the VoLTE protocol, then preventing the VoLTE-capable vehicle telematics unit from attempting to wirelessly connect with the cell tower using an IP multimedia subsystem (IMS) protocol.

According to another embodiment of the invention, there is provided a method of registering a VoLTE-capable vehicle telematics unit with a wireless carrier system. The method includes detecting at the vehicle telematics unit a wireless signal broadcast by a first cell tower; determining from the wireless signal broadcast by a first cell tower that the first cell tower provides cellular service using a VoLTE cellular protocol; directing the VoLTE-capable vehicle telematics unit to wirelessly connect with the first cell tower using an IMS framework; detecting at the vehicle telematics unit a wireless signal broadcast by a second cell tower; determining from the wireless signal broadcast by a second cell tower that the second cell tower provides cellular service using a non-VoLTE cellular protocol; and establishing cellular communications with the second cell tower while maintaining the previously-established IMS connection.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below involve a vehicle telematics unit that uses cellular communications systems. More specifically, the vehicle telematics unit may be specially configured to carry out packetized voice communications over VoLTE cellular protocols—such as LTE—yet be unable to send short message service (SMS) messages using those protocols. Instead, the vehicle telematics unit may rely on non-VoLTE-supporting cellular protocols to communicate SMS messages, such as those using circuit-switched technologies. Presently, vehicle telematics units configured in this way can scan their surroundings to look for acceptable cellular base stations through which cellular communications are possible. As part of this scanning, the VoLTE-capable cellular chipsets used by the vehicle telematics units may be inherently programmed to attempt an IP multimedia subsystem (IMS) connection regardless of whether a VoLTE-capable or LTE cellular protocol is detected from nearby cell towers. But when VoLTE service/LTE is unavailable, the vehicle telematics unit would then establish both voice and SMS using non-VoLTE cellular protocols. In that case, an IMS connection attempt by the vehicle telematics unit may waste network resources servicing such an attempt as well as the energy of the vehicle in making the attempt.

Rather than attempting an IMS connection with a cell tower regardless of the cellular protocol it uses, the vehicle telematics unit can be programmed to identify the cellular protocol used by the cell tower and then depending on the identity of that protocol selectively disable use of the IMS protocol or framework. For instance, if the vehicle telematics unit determines that the cell tower does not support VoLTE, the unit can prevent or disable attempts to connect with the cell tower using IMS considering that both voice and SMS messaging would be carried out using a non-VoLTE or circuit-switched cellular protocol. However, if the cell tower supports VoLTE, the vehicle telematics unit can establish cellular communications using the IMS protocol or framework. Later, if the vehicle telematics unit moves away from the area in which VoLTE service is provided and a new cell tower is detected using a non-VoLTE-supporting cellular protocol, the vehicle telematics unit can still maintain an IMS connection with the new cell tower using a non-VoLTE cellular protocol as the IMS connection is backward compatible.

Communications System—

Figure 1:
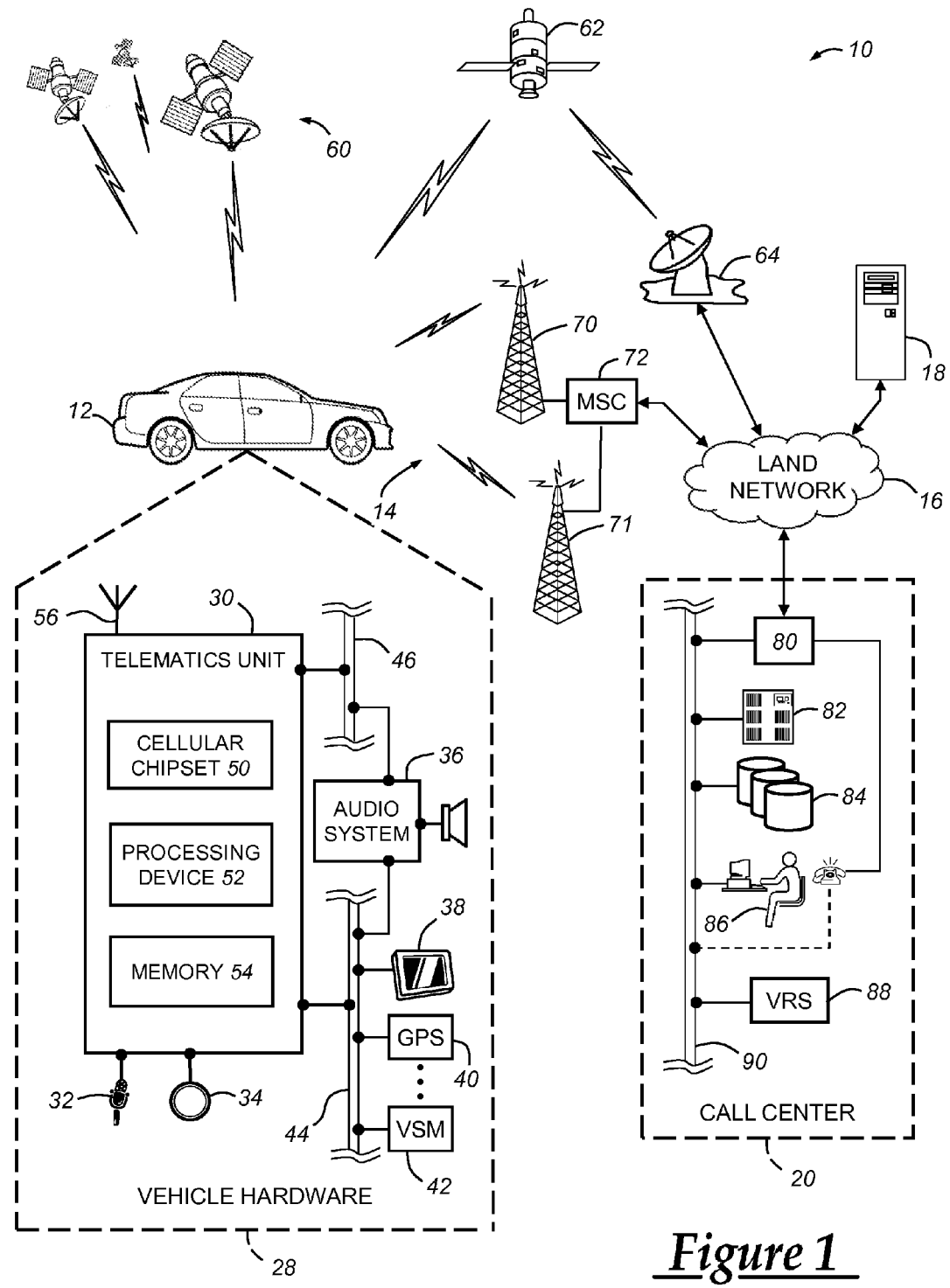
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers two of which are depicted as 70 and 71, one or more mobile switching centers (MSCs) 72, as well as any other networking components required to connect wireless carrier system 14 with land network 16. Each cell tower 70, 71 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As used herein, the term "VoLTE cellular protocol" should be understood to refer to a cellular or wireless communication standard defined by the 3GPP consortium and capable of supporting VoLTE. VoLTE cellular protocols include not only LTE or 4G LTE cellular protocols as they are defined by the 3GPP consortium and outlined in release 8 and 9 (e.g., HSPA+) but also more advanced implementations of LTE sometimes referred to as LTE Advanced, WiMAX-Advanced, or "True 4G." VoLTE can be implemented using an LTE cellular protocol and involve wireless voice communications carried out over the wireless carrier system 14 using an IP multimedia subsystem (IMS) protocol as the IMS protocol is defined by the 3GPP. Non-VoLTE cellular protocol generally refers to cellular protocols that do not support VoLTE, such as 3G or other circuit-switched wireless communications standards for cellular communication that were developed by 3GPP and 3GPP2 prior to LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
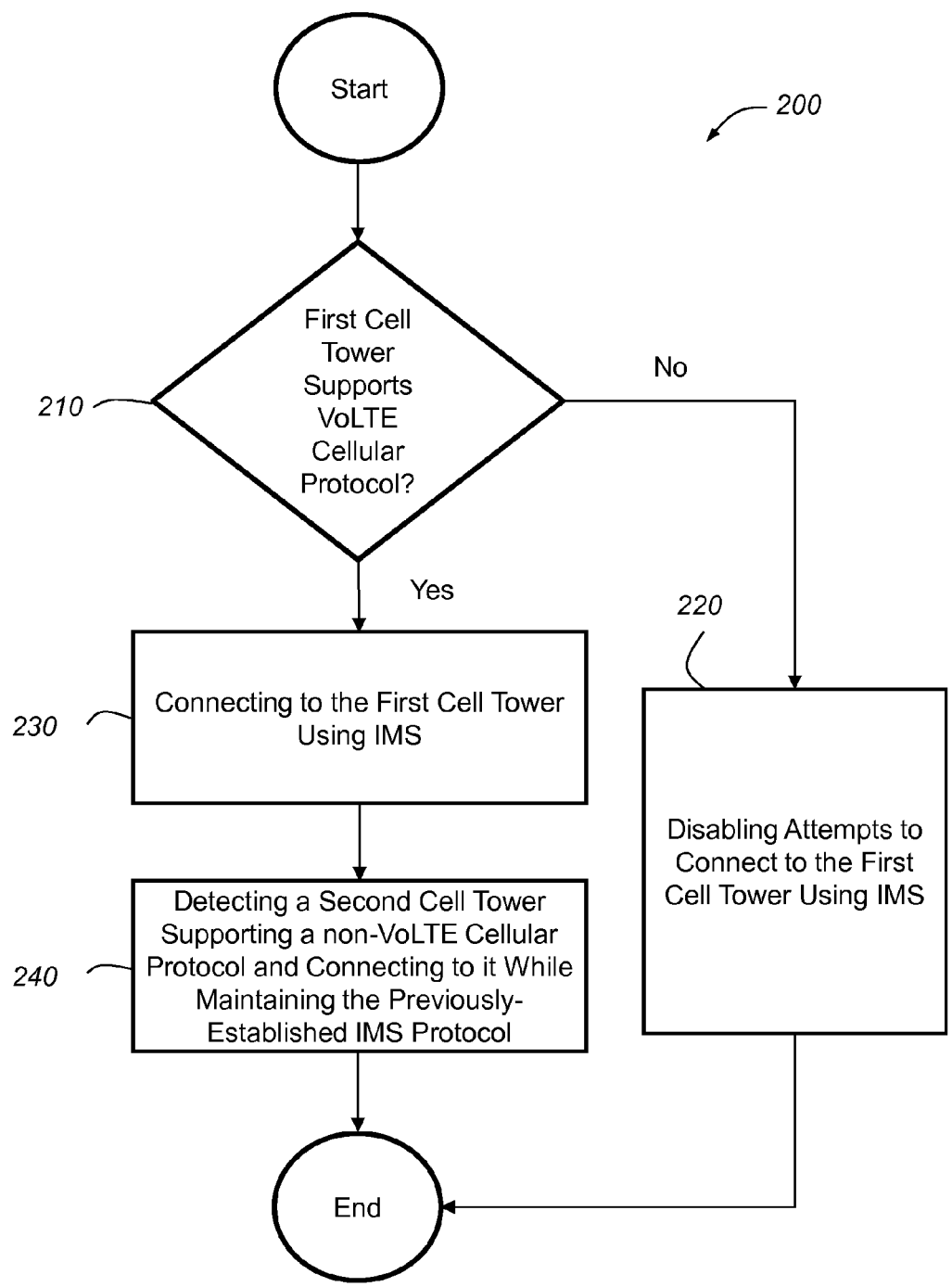
FIG. 2 is a flow chart depicting an embodiment of a method of registering a VoLTE-capable vehicle telematics unit with a wireless carrier system.

Turning now to FIG. 2, there is shown a method of registering a VoLTE-capable vehicle telematics unit 30 with the wireless carrier system 14. The method 200 begins by detecting at the vehicle telematics unit 30 a wireless signal broadcast by a first cell tower 70 and determining from the wireless signal whether the first cell tower provides cellular service using a VoLTE cellular protocol. As part of an attachment procedure with cell towers of the wireless carrier system 14 carried out before cellular communications begin, the vehicle telematics unit 30 can detect wireless signals the cell towers broadcast. The wireless signals include different information pertinent to cellular communications, such as the system/network ID (SID/NID), the strength of the signal, and/or the cellular protocol supported by each cell tower. The vehicle telematics unit 30 can use its cellular chipset 50 to read the data conveyed by the signal broadcast by the cell tower 70 and received via the antenna 56. The chipset 50 can determine the identity of the cellular protocol supported by the first cell tower 70, which can then be output to the processor 52 of the vehicle telematics unit 30. The processor 52 can determine whether or not the cellular protocol used by the cell tower 70 supports VoLTE or not. This can be carried out in different ways, such as by comparing the cellular protocol broadcast by the cell tower 70 with a data table identifying cellular protocols that do or do not support VoLTE. If the cell tower 70 provides cellular service using a non-VoLTE cellular protocol, the method 200 proceeds to step 220; otherwise, the method 200 proceeds to step 230.

At step 220, the VoLTE-capable vehicle telematics unit 30 is directed to disable attempts to wirelessly connect with the cell tower 70 using an IP multimedia subsystem (IMS) framework. The cellular chipset 50 may be programmed to initiate an IMS-based connection despite lacking the ability to establish either VoLTE or packet-switched SMS with the cell tower 70. After determining that the cell tower 70 provides cellular service using a non-VoLTE cellular protocol, the processor 52 of the vehicle telematics unit 30 can direct the cellular chipset 50 not to use IMS protocols when establishing cellular service with the cell tower 70. Instead, the cellular chipset 50 can establish circuit-switched cellular service through the cell tower 70 without the IMS connection despite having the ability to use IMS. The method 200 would then end.

When the cell tower 70 supports VoLTE, the method 200 continues to step 230 and the vehicle telematics unit 30 is directed to wirelessly connect with the first cell tower 70 using an IP multimedia subsystem (IMS) protocol when the cell tower 70 supports VoLTE. In one implementation, the cellular chipset 50 can be permitted to implement its default instructions, which would initiate an IMS connection with the cell tower 70 as part of the cellular attachment process with the vehicle telematics unit 30. When the vehicle telematics unit 30 has attached to the cell tower 70, the IMS connection can be used to support both VoLTE for voice communications as well as circuit-switched SMS messaging. The method 200 proceeds to step 240.

At step 240, a wireless signal broadcast by a second cell tower 71 is detected at the vehicle telematics unit 30 and cellular communications are established while maintaining the previously-established IMS connection. As the vehicle 12 moves, the vehicle telematics unit 30 may end cellular communications with one cell tower and begin cellular communications with another. For example, the vehicle 12 may leave the broadcast area of the first cell tower 70 and enter the broadcast area of a second cell tower 71. Or the signal strength of the second cell tower 71 may become greater relative to the location of the vehicle 12 than the first cell tower 70. When the vehicle telematics unit 30 decides to begin using the second cell tower 71, the unit 30 might determine from the wireless signal broadcast by the second cell tower 71 that it provides cellular service using a non-VoLTE cellular protocol. Based on this determination, the vehicle telematics unit 30 can establish cellular communications with the second cell tower 71 such that both voice communications and SMS messaging is carried out using circuit-switched cellular protocols. However, even though the second cell tower 71 may not support VoLTE cellular protocols, the IMS connection established above during communications with the first cell tower 70 can be maintained and used to carry out SMS messaging with non-VoLTE cellular protocols. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of registering a voice over long-term evolution (VoLTE) capable vehicle telematics unit with a wireless carrier system, comprising the steps of:
   (a) detecting at the vehicle telematics unit a wireless signal broadcast by a cell tower;
   (b) determining from the wireless signal whether the cell tower provides cellular service using a VoLTE cellular protocol; and
   (c) when it is determined in step (b) that the cell tower does not provide cellular service using the VoLTE protocol, then preventing the VoLTE-capable vehicle telematics unit from attempting to wirelessly connect with the cell tower using an IP multimedia subsystem (IMS) protocol;
   wherein step (c) further comprises communicating an instruction not use the IMS protocol from a processor of the vehicle telematics unit to a cellular chipset of the vehicle telematics unit.

2. The method of claim 1, wherein the VoLTE cellular protocol is LTE or LTE Advanced.

3. The method of claim 1, further comprising:
   (d) wirelessly connecting to the cell tower using the IMS protocol when it is determined in step (b) that the cell tower provides cellular service using the VoLTE cellular protocol.

4. A method of registering a voice over long-term evolution (VoLTE) capable vehicle telematics unit with a wireless carrier system, comprising the steps of:
   (a) detecting at the vehicle telematics unit a wireless signal broadcast by a first cell tower;
   (b) determining from the wireless signal broadcast by a first cell tower that the first cell tower provides cellular service using a VoLTE cellular protocol;
   (c) directing the VoLTE-capable vehicle telematics unit to wirelessly connect with the first cell tower using an IP multimedia subsystem (IMS) framework;
   (d) detecting at the vehicle telematics unit a wireless signal broadcast by a second cell tower;
   (e) determining from the wireless signal broadcast by a second cell tower that the second cell tower provides cellular service using a non-VoLTE cellular protocol; and
   (f) establishing cellular communications with the second cell tower while maintaining the previously-established IMS connection.

5. The method of claim 4, wherein the VoLTE cellular protocol is LTE or LTE Advanced.

* * * * *